United States Patent
Xie et al.

(10) Patent No.: US 10,913,823 B2
(45) Date of Patent: Feb. 9, 2021

(54) POSS-BASED POLYURETHANE MODIFIED POLY(PROPYLENE CARBONATE) AND PREPARATION METHOD THEREOF

(71) Applicant: Huazhong University of Science and Technology, Hubei (CN)

(72) Inventors: Xiaolin Xie, Hubei (CN); Yong Wang, Hubei (CN); Xingping Zhou, Hubei (CN); Yunsheng Ye, Hubei (CN); Zhigang Xue, Hubei (CN); Xiaojing Li, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 95 days.

(21) Appl. No.: 16/312,737

(22) PCT Filed: Mar. 28, 2018

(86) PCT No.: PCT/CN2018/080760
§ 371 (c)(1),
(2) Date: Dec. 21, 2018

(87) PCT Pub. No.: WO2018/196536
PCT Pub. Date: Nov. 1, 2018

(65) Prior Publication Data
US 2019/0322811 A1    Oct. 24, 2019

(30) Foreign Application Priority Data

Apr. 24, 2017    (CN) ........................... 2017 1 0270855

(51) Int. Cl.
| | | |
|---|---|---|
| *C08L 69/00* | (2006.01) | |
| *C08G 77/388* | (2006.01) | |
| *C08G 77/448* | (2006.01) | |
| *C08G 77/458* | (2006.01) | |
| *C08G 77/04* | (2006.01) | |

(52) U.S. Cl.
CPC .......... *C08G 77/448* (2013.01); *C08G 77/045* (2013.01); *C08G 77/388* (2013.01); *C08G 77/458* (2013.01); *C08L 69/00* (2013.01)

(58) Field of Classification Search
None
See application file for complete search history.

(56) References Cited

U.S. PATENT DOCUMENTS

2005/0154150 A1    7/2005    Wei et al.

FOREIGN PATENT DOCUMENTS

| CN | 102186861 A | | 9/2011 |
|---|---|---|---|
| CN | 103492464 A | | 1/2014 |
| CN | 106543423 | * | 3/2017 |
| CN | 106573943 A | | 4/2017 |
| CN | 107082885 A | | 8/2017 |
| JP | 2015206030 A | | 11/2015 |

OTHER PUBLICATIONS

Blattmann, Multifunctional POSS Cyclic Carbonates and Non-Isocyanate Polyhydroxyurethane Hybrid Materials; Macromolecules 49 (2016) pp. 742-751. (Year: 2016).*
Li et al., "Fabrication and Properties of Poly(propylene carbonate)/Calcium Carbonate Composites", Journal of Polymer Science: Part B: Polymer Physics, vol. 41, pp. 1806-1813 (2003).
Ma et al., "Compatibility Characterization of Poly(lactic acid)/Poly(propylene carbonate) Blends", Journal of Polymer Science: Part B: Polymer Physics, vol. 44, pp. 94-101 (2006).

* cited by examiner

*Primary Examiner* — David J Buttner
(74) *Attorney, Agent, or Firm* — Hamre, Schumann, Mueller & Larson, P.C.

(57) ABSTRACT

A POSS-based non-isocyanate polyurethane modified poly (propylene carbonate) and a method of making are described. The POSS-based non-isocyanate polyurethane modified poly(propylene carbonate) includes a poly(propylene carbonate) and 1 to 20 wt % of a POSS-based non-isocyanate polyurethane. The method includes subjecting a POSS-based epoxy compound to a cycloaddition reaction with $CO_2$ to obtain a POSS-based cyclic carbonate under an action of a catalyst, and subjecting the POSS-based cyclic carbonate to a ring-opening reaction with a monoamino compound to obtain the POSS-based non-isocyanate polyurethane. Polyurethane bonds and hydroxyl in the POSS-based non-isocyanate polyurethane serve as proton donors and forms a high-density of hydrogen bonds with carbonate units of the poly(propylene carbonate), enhancing the compatibility of the POSS-based non-isocyanate polyurethane with the poly(propylene carbonate).

8 Claims, 2 Drawing Sheets

POSS-BASED POLYURETHANE MODIFIED POLY(PROPYLENE CARBONATE) AND PREPARATION METHOD THEREOF

BACKGROUND OF THE PRESENT INVENTION

Technical Field

The present invention belongs to the field of polymer materials, and more particularly relates to modified poly(propylene carbonate) and a preparation method thereof.

Description of the Related Art

Poly(propylene carbonate) (PPC), also known as polypropylene carbonate, is formed by copolymerization of carbon dioxide and propylene oxide under certain conditions. The chain structure of PPC has a carbon dioxide content of 31% to 50%, and can be completely degraded under the action of microorganisms, thereby being capable of effectively reducing the carbon emission and coping with the problem of climate warming. Meanwhile, as a biodegradable plastic, carbon dioxide based polycarbonate can fundamentally solve the problem of white pollution. In addition, PPC has many advantages such as high barrier properties and transparency, and has broad application prospects in the fields of thin film biomedical materials, packaging materials and the like. However, as an aliphatic polycarbonate, the molecular chain of PPC has weak intermolecular interactions as well as poor mechanical properties and thermal stability, and its glass transition temperature is only about 35° C., which leads to limited development of PPC applications.

In order to broaden the application range of PPC, it is necessary to modify PPC so as to improve its mechanical and thermal properties. At present, PPC modification by physical blending is a widely used method, mainly including blending PPC with other kinds of polymers and blending PPC with inorganic particles.

In the prior art, Wang Ning et al. prepared a blending system of PLA and PPC by melt blending (Journal of polymer science: part B: polymer physics, 2006, 44: 94-101), and the results showed that PLA can significantly improve the tensile strength and thermal stability of the material, but the elongation at break of the blending system is reduced. Meng Yuezhong studied the effect of micro- and nano-scale $CaCO_3$ on PPC performance (Journal of polymer science: part B: polymer physics, 2003, 41: 1806-1813), and the results showed that the tensile strength, hardness and ductility of the composite material are increased with the increase of $CaCO_3$ content; since the nano-scale $CaCO_3$ is easily agglomerated, the composite material exhibits low tensile strength. In general, the compatibility of PPC with other polymers and inorganic materials is poor, resulting in poor performance stability of the composite materials, which does not meet the needs of practical applications.

SUMMARY OF THE PRESENT INVENTION

In view of the above-described defects or improvement requirements in the art, the present invention provides POSS (polyhedral oligomeric silsesquioxane)-based polyurethane modified poly(propylene carbonate) and a preparation method thereof, in which POSS-based non-isocyanate polyurethane is prepared and then blended with poly(propylene carbonate) to obtain the modified poly(propylene carbonate). The blend according to the present invention has good interfacial compatibility and high elongation at break as well as significantly improved tensile strength, Young's modulus, and the like, thereby solving the technical problem that the composite material in the prior art has poor performance and stability due to poor compatibility of the poly(propylene carbonate) with other polymers or inorganic materials, which does not meet the practical application requirements.

In order to achieve the above objective, according to an aspect of the present invention, there is provided POSS-based non-isocyanate polyurethane, characterized in that the POSS-based non-isocyanate polyurethane has a structure shown by a formula (I) or a formula (II):

Formula (I)

Formula (II)

in the formula (I) and formula (II), $R_3$ represents and $R_4$ is selected from the group consisting of C1-C20 alkyl, C1-C20 halogen-substituted alkyl, C1-C20 fatty acid or C1-C20 fatty alcohol.

Preferably, $R_4$ is butyl, 4-carboxybutyl, hydroxyethyl, hydroxypropyl or n-hexyl.

According to another aspect of the present invention, there is provided a method for preparing POSS-based non-isocyanate polyurethane, characterized by comprising:

(1) subjecting POSS-based epoxy compound to cycloaddition reaction with $CO_2$ under the action of a catalyst to obtain POSS-based cyclic carbonate; and (a) subjecting the POSS-based cyclic carbonate to ring-opening reaction with monoamino compound to obtain POSS-based non-isocyanate polyurethane.

Preferably, in the step (1), the catalyst is a porphyrin aluminum complex.

Preferably, in the step (1), the catalyst further includes a cocatalyst, and the cocatalyst is a quaternary ammonium salt or a quaternary phosphonium salt.

Preferably, a molar ratio of the catalyst, the cocatalyst and the POSS-based epoxy compound is 1:(1 to 100):(5000 to 50000).

Preferably, in the step (1), a reaction solvent for the cycloaddition reaction includes one or more selected from the group consisting of dichloromethane, trichloromethane and toluene; the reaction temperature is 20 to 150° C.; and the reaction pressure is 1 to 5 MPa.

Preferably, the catalyst has a structure shown by a formula (III):

Formula (III)

wherein $R_5$, $R_6$, $R_7$, $R_8$ and $R_9$ are each independently selected from the group consisting of hydrogen, halogen, substituted aliphatic group, substituted heteroaliphatic group, substituted aryl and substituted heteroaryl; and X is one selected from the group consisting of halo, —$NO_3$, $CH_3COO$—, $CCl_3COO$—, $CF_3COO$—, $ClO_4$—, $BF_4$—, $BPh_4$-, —CN, —$N_3$, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion or pentafluorophenol oxygen anion;

Preferably, when the cocatalyst is a quaternary ammonium salt, it has a structure shown by a formula (IV), and when the cocatalyst is a quaternary phosphonium salt, it has a structure shown by a formula (V):

Formula (IV)

Formula (V)

where a in the formula (IV) is an integer of 1 to 6; and Y— in the formula (IV) and the formula (V) is one of halide anion, $NO_3^-$, $CH_3COO^-$, $CCl_3COO^-$, $CF_3COO^-$, $ClO_4^-$, $BF_4^-$, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion or pentafluorophenol oxygen anion.

Preferably, reaction conditions of the ring-opening reaction in the step (2) are: the solvent is one or more selected from the group consisting of dichloromethane, DMF, DMSO, tetrahydrofuran, toluene and acetone; the temperature is 20 to 150° C.; and the reaction temperature is 2 to 10 h.

According to another aspect of the present invention, there is provided use of the POSS-based non-isocyanurate polyurethane for the modification of poly(propylene carbonate).

Preferably, the modification of the poly(propylene carbonate) comprises increasing the tensile strength, Young's modulus and elongation at break of the poly(propylene carbonate).

According to another aspect of the present invention, there is provided POSS-based polyurethane modified poly (propylene carbonate), which comprises 1 to 20 wt % of the above POSS-based non-isocyanate polyurethane and the balance of poly(propylene carbonate).

Preferably, the poly(propylene carbonate) has a number average molecular weight of 50,000 to 300,000 daltons; and the poly(propylene carbonate) has a molecular weight fraction index of 1.3 to 4.4.

According to another aspect of the present invention, there is provided a method for preparing modified poly (propylene carbonate), comprising: mixing POSS-based non-isocyanate polyurethane with poly(propylene carbonate) to obtain a modified poly(propylene carbonate) precursor; and melt-blending the modified poly(propylene carbonate) precursor to obtain modified poly(propylene carbonate).

Preferably, in the mixing process, the stirring speed is 200 to 1500 rpm, and the mixing time is 2 to 20 min; and in the melt blending process, the temperature is 100 to 180° C.; and the melt blending time is 2 to 20 min.

In general, by comparing the above technical solution of the present inventive concept with the prior art, the present invention has the following beneficial effects:

(1) in the present invention, POSS-based non-isocyanate polyurethane and poly(propylene carbonate) are blended to prepare modified poly(propylene carbonate). As a novel environmentally friendly silicon material, polyhedral oligomeric silsesquioxane (POSS) not only has low density, high thermal stability and flexibility of organic silicon materials, but also has many advantages such as high strength, high temperature resistance and oxidation resistance of inorganic silicon materials. A large amount of urethane bonds and hydroxyl in the POSS-based non-isocyanate polyurethane serve as proton donors to form high-density hydrogen bonding with carbonate units in the chain structure of the poly (propylene carbonate), and this hydrogen bonding enhances the compatibility of the POSS-based non-isocyanate polyurethane with the poly(propylene carbonate). Therefore, the modified poly(propylene carbonate) according to the present invention has good interfacial compatibility and high elongation at break as well as significantly improved tensile strength, Young's modulus, thermal stability and the like.

(2) in the present invention, blending POSS with polymer materials can significantly improve the mechanical properties and thermal stability of the material. At the same time, POSS has high functionality, and the compatibility of POSS with the polymer substrate can be enhanced by chemical modification. The test results showed that the modified poly(propylene carbonate) has an elongation at break of 9.11% to 24.12%, a tensile strength of 47.11 to 63.87 MPa, and a Young's modulus of 991 to 1822 MPa.

(3) the preparation method of the POSS-based polyurethane according to the present invention is a non-isocyanate method for synthesizing polyurethane, which has the advantages of simple process, low cost, environmental protection and high efficiency, and is suitable for large-scale production. The POSS-based non-isocyanate polyurethane and the poly(propylene carbonate) are processed by a melting method, and this method is simple and controllable.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of The present invention described below can be mutually combined if they are not found to be mutually exclusive.

The present invention provides POSS-based non-isocyanate polyurethane with a structure shown by a formula (I) or a formula (II):

in the formula (I) and formula (II), $R_3$ represents and $R_4$ is selected from the group consisting of C1-C20 alkyl, C1-C20 halogen-substituted alkyl, C1-C20 fatty acid or C1-C20 fatty alcohol.

Figure 1:
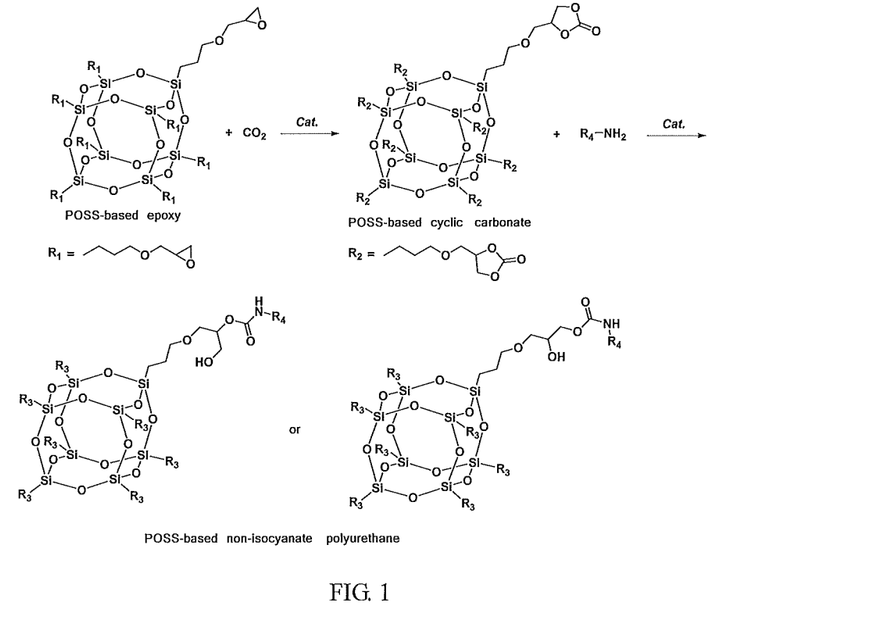
FIG. 1 is a synthetic route diagram of POSS-based non-isocyanate polyurethane according to the present invention.

Preferably, a preparation method of the POSS-based non-isocyanate polyurethane is carried out in accordance with the synthetic route shown in FIG. 1, comprising the following steps:

(1) subjecting POSS-based epoxy compound to cycloaddition reaction with $CO_2$ under the action of a catalyst to to prepare POSS-based cyclic carbonate; and (2) subjecting the POSS-based cyclic carbonate to ring-opening reaction with monoamino compound to obtain POSS-based non-isocyanate polyurethane.

In the step (1), the catalyst is a porphyrin aluminum complex, the POSS-based epoxy compound is subjected to cycloaddition reaction with $CO_2$ under the action of the porphyrin aluminum complex to prepare POSS-based cyclic carbonate; the temperature of the cycloaddition reaction is 20 to 150° C., preferably 80 to 150° C.; and the time of the cycloaddition reaction is 2 to 10 h, preferably 2 to 8 h. The catalyst further includes a cocatalyst, and the cocatalyst is a quaternary ammonium salt or a quaternary phosphonium salt.

In the step (1), a molar ratio of the catalyst, the cocatalyst and the POSS-based epoxy compound is 1:(1 to 100):(5000 to 50000), preferably 1:(50 to 100):(5000 to 10000); the reaction solvent is one of dichloromethane, trichloromethane and toluene; and the reaction pressure, that is, the carbon dioxide pressure is 1 to 5 MPa, preferably 2.0 to 5.0 MPa.

The catalyst has a structure shown in formula (III):

Formula (III)

wherein $R_5$, $R_6$, $R_7$, $R_8$ and $R_9$ are each independently selected from the group consisting of hydrogen, halogen, substituted aliphatic group, substituted heteroaliphatic group, substituted aryl and substituted heteroaryl; and X is one selected from the group consisting of halo, —$NO_3$, $CH_3COO$—, $CCl_3COO$—, $CF_3COO$—, $ClO_4$—, $BF_4$—, $BPh_4$-, —CN, —$N_3$, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion or pentafluorophenol oxygen anion.

When the cocatalyst is a quaternary ammonium salt, it has a structure shown by a formula (IV), and when the cocatalyst is a quaternary phosphonium salt, it has a structure shown by a formula (V):

Formula (IV)

Formula (V)

where a in the formula (IV) is an integer of 1 to 6; and Y— in the formula (IV) and the formula (V) is one of halide anion, $NO_3^-$, $CH_3COO^-$, $CCl_3COO^-$, $CF_3COO^-$, $ClO_4^-$, $BF_4^-$, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion or pentafluorophenol oxygen anion.

In the step (2), the monoamino compound is one selected from C1-C20 alkylamine, C1-C20 amino acid and C1-C20 fatty alcohol amine; and preferably, the monoamino compound is one selected from n-butylamine, n-hexylamine, ethanolamine, propanolamine and butyrate.

In the step (2), the molar ratio of the monoamine compound (that is, the monoamino compound) to the POSS-based cyclic carbonate is preferably (10 to 25):1.

Preferably, in the present invention, the POSS-based cyclic carbonate prepared in the step (1) is first purified, and then subjected to ring-opening reaction with the monoamine compound to obtain non-isocyanate polyurethane. The method of purifying the POSS-based cyclic carbonate in the present invention is different from the methods well known to those skilled in the art. Preferably, the POSS-based cyclic carbonate is first dissolved in a good solvent and then precipitated in a poor solvent. Preferably, the good solvent for the POSS-based cyclic carbonate is dichloromethane and toluene, and the poor solvent is acetone and diethyl ether.

Preferably, in the present invention, the ring-opening reaction in the step (2) is carried out in a nitrogen atmosphere, and the ring-opening reaction in the step (2) is preferably carried out under mechanical stirring; and the stirring rate is 80 to 100 rpm, more preferably 90 to 100 rpm.

In the present invention, in order to carry out sufficient ring-opening reaction of the monoamine compound with the POSS-based cyclic carbonate, reaction conditions of the step (2) are: the solvent is one selected from the group consisting of dichloromethane, DMF, DMSO, tetrahydrofuran, toluene and acetone; the reaction temperature is 20 to 150° C., preferably 20 to 80° C.; and the reaction time is 2 to 10 h, preferably 4 to 10 h.

After the ring-opening reaction in the step (2) is completed, preferably, the reaction product of the ring-opening reaction is purified. A preferred purification method is: diluting the reaction product with dichloromethane, placing it in a low temperature environment for standing, and then filtering it to obtain a precipitate, that is, a final product. Preferably, the reaction product is diluted with dichloromethane to a molar concentration of 10 to 30 mmol/L, more preferably 10 to 25 mmol/L. The low temperature environment has a temperature of −10 to 5° C., more preferably from −5 to 5° C.; and the standing time is preferably 1 to 8 h, more preferably 4 to 8 h.

In the present invention, after obtaining the purified product, the purified product is preferably dried to obtain POSS-based non-isocyanate polyurethane. In the present invention, the drying method is not particularly limited, and a drying method well known to those skilled in the art can be employed. In the present invention, the drying method is stoving, and the stoving temperature is preferably 30 to 50° C. In the embodiments of the present invention, an oven used for the stoving process is a blower oven, an electric oven or an infrared heating oven well known to those skilled in the art.

The POSS-based non-isocyanurate polyurethane synthesized according to the above synthetic route includes two molecules having the structures shown by the formula (I) and the formula (II), and its yield is obtained by calculating the total yield of the two molecules in the embodiments of the present invention.

The above POSS-based non-isocyanate polyurethane modified poly(propylene carbonate) is applied to the modification of poly(propylene carbonate) so as to improve the tensile strength, Young's modulus and elongation at break of the poly(propylene carbonate), achieving a very good result.

The present invention also provides POSS-based polyurethane modified poly(propylene carbonate), comprising poly(propylene carbonate) and 1 to 20 wt % of POSS-based non-isocyanate polyurethane, in which the number average molecular weight of the poly(propylene carbonate) is 50,000 to 300,000 daltons; and the molecular weight fraction index of the poly(propylene carbonate) is 1.3 to 4.4.

Preferably, the present invention provides modified poly(propylene carbonate), comprising 1 to 20 wt % of the above POSS-based non-isocyanate polyurethane and the balance of polypropylene carbonate. In the present invention, the number average molecular weight of the poly(propylene carbonate) is preferably 50,000 to 300,000 daltons, more preferably 100,000 to 180,000 daltons; and the molecular weight fraction index of the poly(propylene carbonate) is preferably 1.3 to 4.4, more preferably 2.3 to 4.1. In the present invention, the source of poly(propylene carbonate) is not particularly limited, and poly(propylene carbonate) well known to those skilled in the art may be used.

The present invention provides a method for preparing modified poly(propylene carbonate) by applying the above technical solution, comprising the following steps:

mixing POSS-based non-isocyanate polyurethane with poly(propylene carbonate) in a high-speed stirrer to obtain a modified poly(propylene carbonate) precursor; and melt-blending the modified poly(propylene carbonate) precursor in an internal mixer to obtain modified poly(propylene carbonate).

In the present invention, the POSS-based non-isocyanate polyurethane is mixed with the poly(propylene carbonate) in the high-speed stirrer to obtain the modified poly(propylene carbonate) precursor. The mixing order of the POSS-based non-isocyanate polyurethane and the poly(propylene carbonate) is not particularly limited in the present invention, and preferably, the POSS-based non-isocyanate polyurethane is added to the poly(propylene carbonate).

In the present invention, the POSS-based non-isocyanate polyurethane and the poly(propylene carbonate) may be separately dried and then mixed; or the POSS-based non-isocyanate polyurethane and the poly(propylene carbonate) may be mixed together and then dried. In the present invention, the drying temperature is preferably 35 to 45° C., more preferably 38 to 40° C.; and the drying time is 20 to 30 h, more preferably 25 to 28 h.

In the present invention, the dried POSS-based non-isocyanurate polyurethane and poly(propylene carbonate) are mixed to obtain a modified poly(propylene carbonate) precursor. In the present invention, in order to fully mix the POSS-based non-isocyanate polyurethane and the poly(propylene carbonate), the stirring speed during the mixing is preferably 200 to 1500 rpm, more preferably 500 to 1400 rpm; and the mixing time is preferably 2 to 20 min, more preferably 5 to 15 min.

The mixing device is not particularly limited in the present invention, and a high-speed mixer, a static mixer, a ribbon mixer or a kneading mixer well known to those skilled in the art may be used. In the embodiments of the present invention, the mixing device is a high-speed mixer.

In the present invention, after obtaining the modified poly(propylene carbonate) precursor, the modified poly(propylene carbonate) precursor is melt-processed to obtain modified poly(propylene carbonate). In the present invention, the processing equipment is not particularly limited, and may be a melt-processing equipment well known to those skilled in the art. In the embodiments of the present invention, the processing equipment may be a Hacker torque rheometer. In the present invention, the processing temperature is preferably 100 to 180° C., more preferably from 110 to 160° C.; the melt-blending time is 2 to 20 min, preferably 5 to 10 min, more preferably 5 to 7 min; and the rotational speed of the melt processing is preferably 30 to 80 rpm, more preferably 50 to 70 rpm.

As a novel environmentally friendly silicon material, POSS not only has low density, high thermal stability and flexibility of organic silicon materials, but also has many advantages such as high strength, high temperature resistance and oxidation resistance of inorganic silicon materials. A large amount of polyurethane bonds and hydroxyl in the POSS-based non-isocyanate polyurethane can serve as proton donors to form high-density hydrogen bonding with carbonate units in the chain structure of the poly(propylene carbonate), and this hydrogen bonding can enhance the compatibility of POSS-based non-isocyanate polyurethane with the poly(propylene carbonate). Therefore, the modified poly(propylene carbonate) according to the present invention has good interfacial compatibility and high elongation at break as well as significantly improved tensile strength, Young's modulus, thermal stability and the like. In the present invention, mechanical properties of the obtained modified poly(propylene carbonate) were tested according to GB1040-2006. The test results showed that the POSS-based polyurethane modified poly(propylene carbonate) according to the present invention has an elongation at break of 9.11% to 24.12%, a tensile strength of 47.11 to 63.87 MPa, and a Young's modulus of 991 to 1822 MPa.

The preparation method of the POSS-based polyurethane according to the present invention is a non-isocyanate method for synthesizing polyurethane, which has the advantages of simple process, low cost, environmental protection and high efficiency, and is suitable for large-scale production. The POSS-based non-isocyanate polyurethane and the poly(propylene carbonate) are processed by a melting method, and this method is simple and controllable.

The following are embodiments:

Embodiments 1 to 4 describes preparation processes of the POSS-based cyclic carbonate in which POSS-based epoxy compound is subjected to cycloaddition reaction with carbon dioxide under the action of a catalyst;

Embodiments 5 to 10 describes preparation processes of the POSS-based non-isocyanate polyurethane in which the POSS-based cyclic carbonate prepared in Embodiments 1 to 4 is subjected to ring-opening reaction with monoamine compound;

Embodiments 11 to 20 describes preparation processes of the POSS-based amino modified poly(propylene carbonate) according to the present invention in which the poly(propylene carbonate) and the POSS-based non-isocyanate polyurethane prepared in Embodiment 5 are mixed and then melt-processed.

Embodiment 1

100 mmol of POSS-based epoxy compound, 0.01 mmol of 5,10,15,20-tetrakis(4-chlorophenyl)porphyrin aluminum chloride, 1 mmol of bis(triphenylphosphine)iminium chloride (PPNCl) and 5 mL of dichloromethane were added to a 50 mL autoclave previously dried in an oven at 80° C. for 2 h, and the autoclave was sealed and then filled with $CO_2$ to 1.0 MPa through a $CO_2$ supply line with a pressure regulating function.

Figure 2:
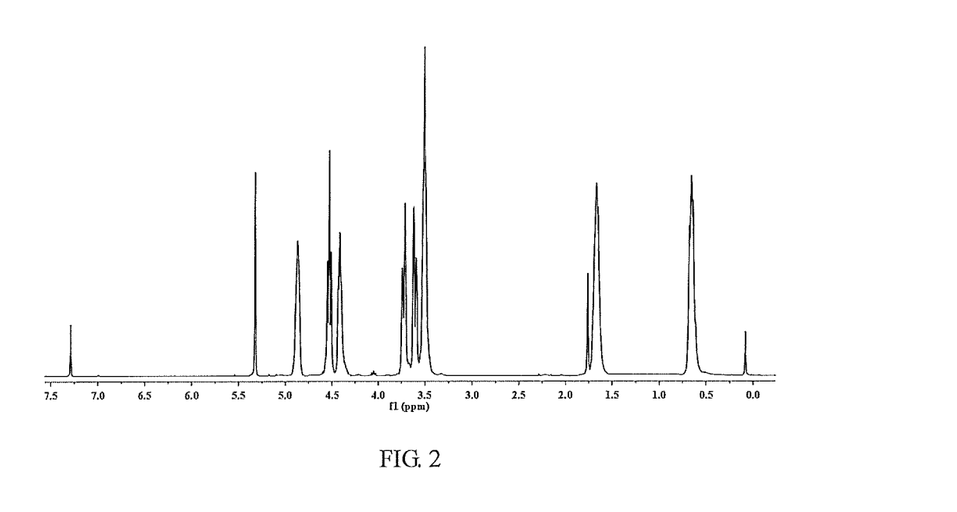
FIG. 2 shows a nuclear magnetic hydrogen spectrum of the POSS-based cyclic carbonate prepared in Embodiment 1.

The autoclave was placed in a constant temperature oil bath at 80° C., the pressure was raised to 5.0 MPa, and the reaction was carried out for 8 hours. After the reaction was finished, the autoclave was cooled to room temperature, carbon dioxide was slowly removed, and the crude product was taken out and characterized. The $^1$H-NMR analysis result showed that the conversion rate of the POSS-based epoxy compound was higher than 99%. The remaining product was diluted with a small amount of dichloromethane, and precipitated after addition of acetone. The solid obtained by filtration, that is, POSS-based cyclic carbonate, was dried in a vacuum oven at 40° C. to a constant weight with a yield of 97%. FIG. 2 is a nuclear magnetic hydrogen spectrum of the POSS-based cyclic carbonate prepared in the present embodiment, and the spectrum confirms that it is POSS-based cyclic carbonate.

Embodiment 2

100 mmol of POSS-based epoxy compound, 0.02 mmol of 5,10,15,20-tetrakis(2,4-dichlorophenyl)porphyrin aluminum chloride, 1 mmol of tetrahexylammonium bromide and 5 mL of toluene were added to a 50 mL autoclave previously dried in an oven at 80° C. for 4 h, and the autoclave was sealed and then filled with $CO_2$ to 1.0 MPa through a $CO_2$ supply line with a pressure regulating function.

The autoclave was placed in a constant temperature oil bath at 150° C., the pressure was raised to 1.0 MPa, and the reaction was carried out for 1 hours. After the reaction was finished, the autoclave was cooled to room temperature, carbon dioxide was slowly removed, and the crude product was taken out and characterized. The $^1$H-NMR analysis result showed that the conversion rate of the POSS-based epoxy compound was higher than 99%. The remaining product was diluted with a small amount of dichloromethane, and precipitated after addition of acetone. The solid obtained by filtration, that is, POSS-based cyclic carbonate, was dried in a vacuum oven at 35° C. to a constant weight with a yield of 98%.

Embodiment 3

100 mmol of POSS-based epoxy compound, 0.02 mmol of 5,10,15,20-tetrakis(2,3,4,5,6-pentafluorophenyl)porphyrin aluminum chloride, 2 mmol of tetrabutylammonium iodide and 5 mL of dichloromethane were added to a 50 mL autoclave previously dried in an oven at 80° C. for 2 h, and the autoclave was sealed and then filled with $CO_2$ to 1.0 MPa through a $CO_2$ supply line with a pressure regulating function.

The autoclave was placed in a constant temperature oil bath at 150° C., the pressure was raised to 2.0 MPa, and the reaction was carried out for 2 hours. After the reaction was finished, the autoclave was cooled to room temperature, carbon dioxide was slowly removed, and the crude product was taken out and characterized. The $^1$H-NMR analysis result showed that the conversion rate of the POSS-based epoxy compound was higher than 99%. The remaining product was diluted with a small amount of dichloromethane, and precipitated after addition of acetone. The solid obtained by filtration, that is, POSS-based cyclic carbonate, was dried in a vacuum oven at 40° C. to a constant weight with a yield of 96%.

Embodiment 4

100 mmol of POSS-based epoxy compound, 0.02 mmol of 5,10,15,20-tetrakis(1,3-dichlorophenyl)porphyrin aluminum acetate, 2 mmol of bis(triphenylphosphine)iminium chloride (PPNCl) and 5 mL of dichloromethane were added to a 50 mL autoclave previously dried in an oven at 80° C. for 2 h, and the autoclave was sealed and then filled with $CO_2$ to 0.2 MPa through a $CO_2$ supply line with a pressure regulating function.

The autoclave was placed in a constant temperature oil bath at 20° C., the pressure was raised to 5.0 MPa, and the reaction was carried out for 10 hours. After the reaction was finished, the autoclave was cooled to room temperature, carbon dioxide was slowly removed, and the crude product was taken out and characterized. The $^1$H-NMR analysis result showed that the conversion rate of the POSS-based epoxy compound was higher than 99%. The remaining product was diluted with a small amount of dichloromethane, and precipitated after addition of acetone. The solid obtained by filtration, that is, POSS-based cyclic carbonate, was dried in a vacuum oven at 40° C. to a constant weight with a yield of 98%.

Embodiment 5

Figure 3:
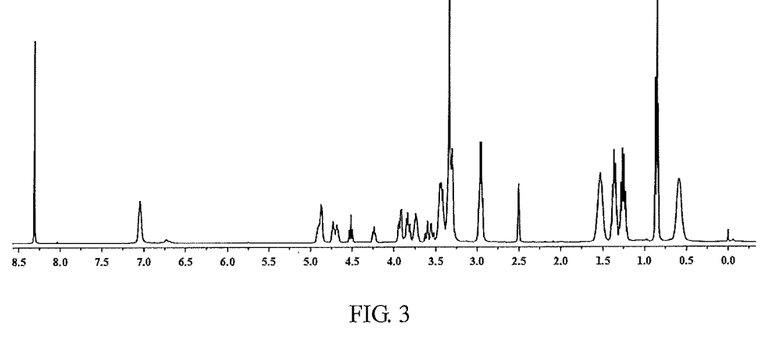
FIG. 3 shows a nuclear magnetic hydrogen spectrum of the POSS-based non-isocyanate polyurethane prepared in Embodiment 5.

A dried 500 mL round-bottom flask was filled with high purity nitrogen, and then 0.8 mol of diethanolamine, 0.05 mol of POSS-based cyclic carbonate and 150 mL of dry dichloromethane were added to the round-bottom flask. The round-bottom flask was placed in a water bath, the temperature is controlled to be 20° C., and stirring is performed at a rate of 100 rpm for 10 h. After the reaction was completed, the obtained POSS-based polyurethane was diluted by 250 mL of dichloromethane to a concentration of 10 mmol/L, placed in a refrigerator at −5° C. for 4 h, and then filtered. The resulting precipitate was dried in a vacuum oven at 40° C. to a constant weight, and then characterized. The $^1$H-NMR analysis result showed that the precipitate was POSS-based non-isocyanurate polyurethane shown in the formula (I) and formula (II), and its nuclear magnetic hydrogen spectrum is shown in FIG. 3, in which $R_4$ is ethoxyl, and the yield of the POSS-based non-isocyanurate polyurethane is 87%. FIG. 3 shows a nuclear magnetic hydrogen spectrum of the POSS-based non-isocyanate polyurethane prepared in the present embodiment, and the spectrum confirms that it is a mixture of POSS-based non-isocyanurate polyurethane shown by the formula (I) and the formula (II), in which $R_4$ is ethoxyl.

Embodiment 6

A dried 500 mL round-bottom flask was filled with high purity nitrogen, and then 0.8 mol of n-butylamine, 0.05 mol of POSS-based cyclic carbonate and 150 mL of dry dichloromethane were added to the round-bottom flask. The round-bottom flask was placed in a water bath, the temperature is controlled to be 80° C., and stirring is performed at a rate of 100 rpm for 4 h. After the reaction was completed, the obtained POSS-based polyurethane was diluted by 50 mL of dichloromethane to a concentration of 25 mmol/L, placed in a refrigerator at 0° C. for 4 h, and then filtered. The resulting precipitate was dried in a vacuum oven at 40° C. to a constant weight, and then characterized. The $^1$H-NMR analysis result showed that the precipitate was POSS-based non-isocyanurate polyurethane shown in the formula (I) and formula (II), in which $R_4$ is butyl, and the yield of the POSS-based non-isocyanurate polyurethane is 92%.

Embodiment 7

A dried 500 mL round-bottom flask was filled with high purity nitrogen, and then 0.8 mol of butyrate, 0.05 mol of POSS-based cyclic carbonate and 150 mL of dry toluene were added to the round-bottom flask. The round-bottom flask was placed in a water bath, the temperature is controlled to be 100° C., and stirring is performed at a rate of 100 rpm for 8 h. After the reaction was completed, the obtained POSS-based polyurethane was diluted by 50 mL of toluene to a concentration of 30 mmol/L, placed in a refrigerator at −10° C. for 8 h, and then filtered. The resulting precipitate was dried in a vacuum oven at 50° C. to a constant weight, and then characterized. The $^1$H-NMR analysis result showed that the precipitate was POSS-based non-isocyanurate polyurethane shown in the formula (I) and formula (II), in which $R_4$ is 4-carboxybutyl, and the yield of the POSS-based non-isocyanurate polyurethane is 94%.

Embodiment 8

A dried 500 mL round-bottom flask was filled with high purity nitrogen, and then 0.8 mol of n-hexylamine, 0.05 mol of POSS-based cyclic carbonate and 150 mL of dry dichloromethane were added to the round-bottom flask. The round-bottom flask was placed in a water bath, the temperature is controlled to be 150° C., and stirring is performed at a rate of 100 rpm for 4 h. After the reaction was completed, the obtained POSS-based polyurethane was diluted by 250 mL of DMF to a concentration of 12.5 mmol/L, placed in a refrigerator at 5° C. for 1 h, and then filtered. The resulting precipitate was dried in a vacuum oven at 35° C. to a constant weight, and then characterized. The $^1$H-NMR analysis result showed that the precipitate was POSS-based non-isocyanurate polyurethane shown in the formula (I) and formula (II), in which $R_4$ is n-hexyl, and the yield of the POSS-based non-isocyanurate polyurethane is 62%.

Embodiment 9

A dried 500 mL round-bottom flask was filled with high purity nitrogen, and then 0.8 mol of diethanolamine, 0.05 mol of POSS-based cyclic carbonate and 150 mL of dry toluene were added to the round-bottom flask. The round-bottom flask was placed in a water bath, the temperature is controlled to be 60° C., and stirring is performed at a rate of 100 rpm for 4 h. After the reaction was completed, the obtained POSS-based polyurethane was diluted by 50 mL of trichloromethane to a concentration of 25 mmol/L, placed in a refrigerator at 3° C. for 4 h, and then filtered. The resulting precipitate was dried in a vacuum oven at 40° C. to a constant weight, and then characterized. The $^1$H-NMR analysis result showed that the precipitate was POSS-based non-isocyanurate polyurethane shown in the formula (I) and formula (II), in which $R_4$ is ethoxyl, and the yield of the POSS-based non-isocyanurate polyurethane is 92%.

Embodiment 10

A dried 500 mL round-bottom flask was filled with high purity nitrogen, and then 0.8 mol of triethanolamine, 0.05 mol of POSS-based cyclic carbonate and 150 mL of dry dichloromethane were added to the round-bottom flask. The round-bottom flask was placed in a water bath, the temperature is controlled to be 35° C., and stirring is performed at a rate of 100 rpm for 5 h. After the reaction was completed, the obtained POSS-based polyurethane was diluted by 100 mL of dichloromethane to a concentration of 20 mmol/L, placed in a refrigerator at 2° C. for 4 h, and then filtered. The resulting precipitate was dried in a vacuum oven at 40° C. to a constant weight, and then characterized. The $^1$H-NMR analysis result showed that the precipitate was POSS-based non-isocyanurate polyurethane shown in the formula (I) and formula (II), in which $R_4$ is hydroxypropyl, and the yield of the POSS-based non-isocyanurate polyurethane is 91%.

Embodiment 11

49.5 g of poly(propylene carbonate) (the number average molecular weight M=162,000, PDI=3.17, the elongation at break is 14.71%, and the tensile strength is 50.8 MPa) and 0.5 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 12

49 g of poly(propylene carbonate) (the number average molecular weight $M_n$=162,000, PDI=3.17, the elongation at break is 14.71%, and the tensile strength is 50.8 MPa) and 1 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 13

48.5 g of poly(propylene carbonate) (the number average molecular weight $M_n$=162,000, PDI=3.17, the elongation at break is 14.71%, and the tensile strength is 50.8 MPa) and 1.5 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 14

46.25 g of poly(propylene carbonate) (the number average molecular weight $M_n$=162,000, PDI=3.17, the elongation at break is 14.71%, and the tensile strength is 50.8 MPa) and 3.75 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 15

45 g of poly(propylene carbonate) (the number average molecular weight $M_n$=162,000, PDI=3.17, the elongation at break is 14.71%, and the tensile strength is 50.8 MPa) and 5 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 16

43.75 g of poly(propylene carbonate) (the number average molecular weight $M_n$=162,000, PDI=3.17, the elongation at break is 14.71%, and the tensile strength is 50.8 MPa) and 6.25 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 17

42.5 g of poly(propylene carbonate) (the number average molecular weight $M_n$=162,000, PDI=3.17, the elongation at break is 14.71%, and the tensile strength is 50.8 MPa) and 7.5 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 18

42 g of poly(propylene carbonate) (the number average molecular weight $M_n$=162,000, PDI=3.17, the elongation at break is 14.71%, and the tensile strength is 50.8 MPa) and 8 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tableted at 140° C. for 3 min, and cold pressed for 1 min, and its mechanical properties were tested according to GB 1040-2006.

Embodiment 19

41 g of poly(propylene carbonate) (the number average molecular weight $M_n$=162,000, PDI=3.17, the elongation at break is 14.71%, and the tensile strength is 50.8 MPa) and 9 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tabletted at 140° C. for 3 min, and cold pressed for 1 min, and its mechanical properties were tested according to GB 1040-2006.

Embodiment 20

40 g of poly(propylene carbonate) (the number average molecular weight $M_n$=162,000, PDI=3.17, the elongation at break is 14.71%, and the tensile strength is 50.8 MPa) and 10 g of POSS-based non-isocyanurate polyurethane prepared in Embodiment 5 were mixed to obtain a mixture, and the mixture was dried in a vacuum oven at 40° C. for 20 h and further mixed in a high-speed mixer at a rotational speed of 1000 rpm for 5 min. Then, the uniformly mixed modified poly(propylene carbonate) precursor was melt processed in a Hacker torque rheometer with a melt processing time of 5 min, a rotational speed of 60 rpm and a temperature of 140° C. to obtain modified poly(propylene carbonate). In the present invention, the obtained modified poly(propylene carbonate) was tabletted at 140° C. for 3 min, and cold pressed for 1 min, and its mechanical properties were tested according to GB 1040-2006.

The test results of the mechanical properties of the poly(propylene carbonate) obtained in Embodiments 11 to 20 are shown in Table 1.

TABLE 1

| Embodiment | Content of POSS-based non-isocyanurate polyurethane (wt %) | Tensile strength (MPa) | Young's modulus (MPa) | Elongation at break (%) |
|---|---|---|---|---|
| Embodiment 11 | 1 | 54.13 | 991 | 16.79 |
| Embodiment 12 | 2 | 56.19 | 1124 | 15.82 |
| Embodiment 13 | 3 | 59.14 | 1095 | 16.98 |
| Embodiment 14 | 7.5 | 63.87 | 1322 | 19.24 |
| Embodiment 15 | 10 | 61.22 | 1398 | 23.56 |
| Embodiment 16 | 12.5 | 60.32 | 1521 | 24.12 |
| Embodiment 17 | 15 | 57.14 | 1601 | 21.55 |
| Embodiment 18 | 16 | 49.27 | 1523 | 18.24 |
| Embodiment 19 | 18 | 47.11 | 1822 | 16.79 |
| Embodiment 20 | 20 | 51.28 | 1716 | 15.11 |

In the present invention, the initial poly(propylene carbonate) used in Embodiments 11 to 20 has an elongation at break of 14.71%. As can be seen from Table 1, the elongations at break of the POSS-based non-isocyanurate polyurethane modified poly(propylene carbonate) prepared in the present invention are improved to different degrees. Therefore, the POSS-based non-isocyanurate polyurethane having the structure shown by the formula (I) according to the present invention has a toughening effect. The test results show that the modified poly(propylene carbonate) has an elongation at break of 9.11% to 24.12%, a tensile strength of 47.11 to 63.87 MPa and a Young's modulus of 991 to 1822 MPa.

The preparation method of the POSS-based polyurethane according to the present invention is a non-isocyanate method for synthesizing polyurethane, which has the advantages of simple process, low cost, environmental protection and high efficiency, and is suitable for large-scale production. The POSS-based non-isocyanate polyurethane and the poly(propylene carbonate) are processed by a melting method, and this method is simple and controllable.

The above description of the embodiments is merely to assist in understanding the method of the present invention and its core concept. It should be noted that those skilled in the art can make various modifications and changes to the present invention without departing from the spirit and scope of the present invention. The above description of the disclosed embodiments enables those skilled in the art to implement or use the present invention. Various modifications to these embodiments are obvious to those skilled in the art, and the general principles defined herein may be implemented in other embodiments without departing from the spirit or scope of The present invention. Therefore, the present invention is not intended to be limited to the embodiments shown herein, but to cover the broadest scope consistent with the principles and novel features disclosed herein.

What is claimed is:

1. A POSS-based non-isocyanate polyurethane, wherein the POSS-based non-isocyanate polyurethane has the structure shown by formula (I) or formula (II):

in the formula (I) and formula (II), $R_3$ represents or

-continued and R$_4$ is selected from the group consisting of C1-C20 alkyl, C1-C20 halogen-substituted alkyl, C1-C20 fatty acid, and C1-C20 fatty alcohol.

2. A method for preparing a POSS-based non-isocyanate polyurethane, comprising:
  (1) subjecting a POSS-based epoxy compound to a cycloaddition reaction with CO$_2$ under an action of a catalyst to obtain a POSS-based cyclic carbonate; and
  (2) subjecting the POSS-based cyclic carbonate to ring-opening reaction with a monoamino compound to obtain the POSS-based non-isocyanate polyurethane.

3. The method for preparing the POSS-based non-isocyanate polyurethane of claim 2, wherein in the step (1), the catalyst is a porphyrin aluminum complex.

4. The method for preparing the POSS-based non-isocyanate polyurethane of claim 2, wherein in the step (1), the catalyst includes a cocatalyst, and the cocatalyst is a quaternary ammonium salt or a quaternary phosphonium salt.

5. The method for preparing the POSS-based non-isocyanate polyurethane of claim 2, wherein in the step (1), a reaction solvent for the cycloaddition reaction includes one or more selected from the group consisting of dichloromethane, trichloromethane, and toluene;
  a reaction temperature for the cycloaddition reaction is 20 to 150° C.; and
  a reaction pressure for the cycloaddition reaction is 1 to 5 MPa.

6. The method for preparing the POSS-based non-isocyanate polyurethane of claim 2, wherein the catalyst includes a compound having the structure shown by formula (III):

where R$_5$, R$_6$, R$_7$, R$_8$ and R$_9$ are each independently selected from the group consisting of hydrogen, halogen, substituted aliphatic group, substituted heteroaliphatic group, substituted aryl, and substituted heteroaryl; and X is one selected from the group consisting of halo, —NO$_3$, CH$_3$COO—, CCl$_3$COO—, CF$_3$COO—, ClO$_4$—, BF$_4$—, BPh$_4$-, —CN, —N$_3$, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion, and pentafluorophenol oxygen anion;

the catalyst further includes a cocatalyst, and the cocatalyst is a quaternary ammonium salt or a quaternary phosphonium salt;

when the cocatalyst is a quaternary ammonium salt, the cocatalyst has the structure shown by formula (IV), and when the cocatalyst is a quaternary phosphonium salt, the cocatalyst has the structure shown by formula (V):

Formula (IV)

Formula (V)

where a in the formula (IV) is an integer of 1 to 6; and Y in the formula (IV) and the formula (V) is halide anion, NO$_3$⁻, CH$_3$COO⁻, CCl$_3$COO⁻, CF$_3$COO⁻, ClO$_4$⁻, BF$_4$⁻, p-methylbenzoate, p-toluenesulfonate, o-nitrophenol oxygen anion, p-nitrophenol oxygen anion, m-nitrophenol oxygen anion, 2,4-dinitrophenol oxygen anion, 3-5 dinitrophenol oxygen anion, 2,4,6-trinitrophenol oxygen anion, 3,5-dichlorophenol oxygen anion, 3,5-difluorophenol oxygen anion, 3,5-di(trifluoromethyl)phenol oxygen anion, or pentafluorophenol oxygen anion.

7. A POSS-based polyurethane modified poly(propylene carbonate), comprising poly(propylene carbonate) and 1 to 20 wt % of the POSS-based non-isocyanate polyurethane of claim 1.

8. A method for preparing a modified poly(propylene carbonate), comprising:
  mixing a POSS-based non-isocyanate polyurethane with poly(propylene carbonate) to obtain a modified poly(propylene carbonate) precursor; and
  melt-blending the modified poly(propylene carbonate) precursor to obtain the modified poly(propylene carbonate).

* * * * *